(12) United States Patent
Kobayashi (10) Patent No.: US 10,143,189 B2
(45) Date of Patent: Dec. 4, 2018

(54) FISHING REEL

(71) Applicant: Pure Fishing Japan Co., Ltd, Tokyo (JP)

(72) Inventor: Kimio Kobayashi, Tokyo (JP)

(73) Assignee: Pure Fishing Japan Co., Ltd, Tokyo (JP)

( * ) Notice: Subject to any disclaimer, the term of this patent is extended or adjusted under 35 U.S.C. 154(b) by 0 days.

(21) Appl. No.: 15/528,794

(22) PCT Filed: Oct. 21, 2015

(86) PCT No.: PCT/JP2015/079704
§ 371 (c)(1),
(2) Date: Nov. 14, 2017

(87) PCT Pub. No.: WO2017/068666
PCT Pub. Date: Apr. 27, 2017

(65) Prior Publication Data
US 2018/0055027 A1    Mar. 1, 2018

(51) Int. Cl.
*A01K 89/00*     (2006.01)
*A01K 89/01*     (2006.01)
*A01K 89/015*    (2006.01)

(52) U.S. Cl.
CPC .... *A01K 89/011223* (2015.05); *A01K 89/006* (2013.01); *A01K 89/01* (2013.01); *A01K 89/01928* (2015.05); *A01K 89/01929* (2015.05); *A01K 89/011221* (2015.05); *A01K 89/011222* (2015.05)

(58) Field of Classification Search
CPC ............ A01K 89/01; A01K 89/011221; A01K 89/011222; A01K 89/011223; A01K 89/015; A01K 89/01928; A01K 89/01929; A01K 89/0193
See application file for complete search history.

(56) References Cited

U.S. PATENT DOCUMENTS

| 3,946,963 | A | 3/1976 | Oberg | |
|---|---|---|---|---|
| 5,513,918 | A * | 5/1996 | Wan | ...................... F16C 33/667 210/171 |
| 6,575,631 | B2 * | 6/2003 | Shoda | ...................... F16C 19/36 384/447 |
| 2003/0111569 | A1 | 6/2003 | Hitomi | |
| 2003/0173437 | A1 * | 9/2003 | Iwabuchi | ........... A01K 89/0108 242/231 |

(Continued)

FOREIGN PATENT DOCUMENTS

| JP | 57-33222 A | 2/1982 |
|---|---|---|
| JP | 2000-41543 A | 2/2000 |
| JP | 2002-101795 A | 4/2002 |
| JP | 2002-238413 A | 8/2002 |

(Continued)

OTHER PUBLICATIONS

International Search report dated Dec. 22, 2017 from PCT/JP2015/079704.

*Primary Examiner* — Emmanuel M Marcelo
(74) *Attorney, Agent, or Firm* — Husch Blackwell LLP (57) ABSTRACT

There is provided a reel comprising a bearing in which the inward surfaces of the outer ring and inner ring of the bearing are covered with a liquid water-repellent agent having lubricity, and further the exposed surfaces of the outer ring and the inner ring are also covered with the water-repellent agent or another water-repelling material.

9 Claims, 6 Drawing Sheets

(56) References Cited

U.S. PATENT DOCUMENTS

| | | | |
|---|---|---|---|
| 2005/0146265 A1 | 7/2005 | Fukuchi et al. | |
| 2008/0173745 A1* | 7/2008 | Takechi | A01K 89/015 |
| | | | 242/321 |
| 2008/0219610 A1 | 9/2008 | Nakatani et al. | |
| 2011/0069917 A1* | 3/2011 | Yamada | B65G 39/09 |
| | | | 384/470 |
| 2012/0048981 A1* | 3/2012 | Ohara | A01K 89/0108 |
| | | | 242/230 |
| 2013/0163908 A1* | 6/2013 | Haag | F16C 33/445 |
| | | | 384/470 |
| 2015/0063733 A1 | 3/2015 | Ohara | |
| 2015/0115087 A1* | 4/2015 | Ohara | F16C 32/0406 |
| | | | 242/223 |
| 2015/0115088 A1* | 4/2015 | Toma | A01K 89/01928 |
| | | | 242/283 |
| 2015/0122930 A1* | 5/2015 | Ohara | F16C 33/765 |
| | | | 242/321 |
| 2016/0061263 A1 | 3/2016 | Ohara | |
| 2016/0073619 A1* | 3/2016 | Ochiai | A01K 89/0108 |
| | | | 242/230 |
| 2017/0037905 A1 | 2/2017 | Ohara | |

FOREIGN PATENT DOCUMENTS

| | | |
|---|---|---|
| JP | 2002-291384 A | 10/2002 |
| JP | 2002-339995 A | 11/2002 |
| JP | 2003-082220 A | 3/2003 |
| JP | 2004-290153 A | 10/2004 |
| JP | 2005-019103 A | 1/2005 |
| WO | 2003/041452 A1 | 5/2003 |
| WO | 2006/043566 A1 | 4/2006 |
| WO | 2013-161625 A1 | 10/2013 |

\* cited by examiner

FISHING REEL

CROSS REFERENCE TO RELATED APPLICATIONS

This application is a U.S. National Phase Application of International Application No. PCT/JP2015/079704 filed on Oct. 21, 2015. The disclosure of International Application No. PCT/JP2015/079704 is incorporated herein by reference.

TECHNICAL FIELD

The present invention relates to a fishing reel excellent in resistance to corrosion and salt engagement.

BACKGROUND ART

A fishing reel has many rotary members such as a rotor, a spool, and a handle shaft, and such rotary members are rotatably supported with a reel main body or other parts through bearings. In fishing reels, a ball bearing is typically used as a bearing. This type of bearing comprises an outer ring 3 and an inner ring 4 disposed at an interval from each other, rolling elements 7 provided in contact with these, and a retainer 8 retaining the rolling elements 7 at predetermined intervals, as shown in FIG. 6, and a space between the outer ring 3 and the inner ring 4 usually communicates with the outside.

Generally, a fishing reel is used in an environment exposed to water, and water therefore enters inside the reel and is prone to cause the corrosion of the bearings. In addition, when a fishing reel is used in an environment exposed to seawater, the seawater enters the gaps between rolling elements and the raceway surfaces on the outer ring and inner ring of a bearing, the seawater crystallizes out and may hinder the rotation of rotary members and cause an abnormal noise and fixation, which is so-called salt engagement. Therefore, in fishing reels, it is necessary to prevent the corrosion of members such as bearings and prevent a decrease in rotation function due to the crystallization of seawater.

Bearings used in fishing reels are usually made of stainless steel excellent in corrosion resistance as well as hardness and impact resistance. When a fishing reel is used in an environment exposed to seawater, and the like, however, high corrosion resistance is required, but the properties of stainless steel itself may be solely insufficient for the corrosion resistance.

Figure 6:
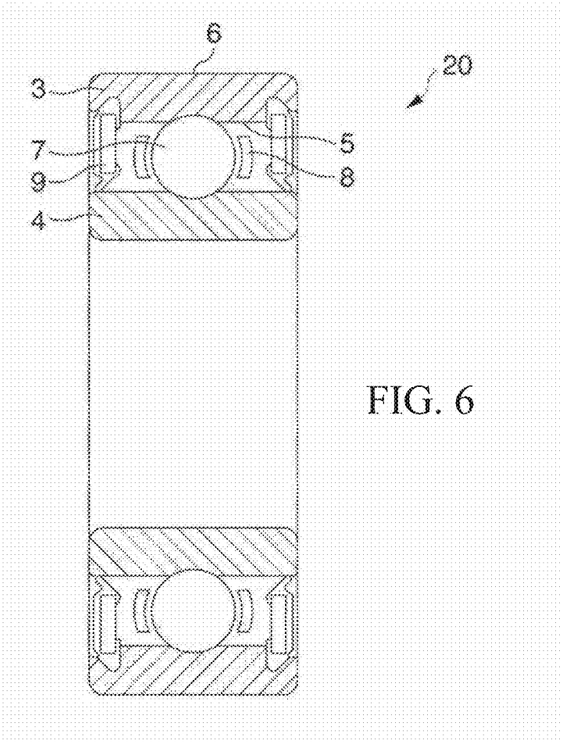
FIG. 6 is a cross-sectional view schematically showing one example of a conventional bearing.

In order to address defective rotations due to salt engagement, conventionally, as shown in FIG. 6, has been used a bearing 20 comprising a shield 9 made of an elastic body which is provided between an outer ring 4 and an inner ring 5 in a state of being in contact with these. This shield 9 is effective in preventing the entry of seawater into the space between an outer ring 3 and an inner ring 4, but the shield 9 is provided in contact with both of the rings in order to prevent the entry of seawater, and therefore has a problem that increase in a load is caused when the outer ring 3 and the inner ring 4 rotate relatively.

In this regard, Patent Literatures 1 and 2 propose a bearing in which a magnetic fluid is retained at a predetermined place in the space between an outer ring and an inner ring by magnetic force to prevent the entry of seawater. An advantage of this bearing is that a fluid is in contact with an outer ring and an inner ring, and therefore a load thereon is small when they rotate relatively. This bearing however requires a member such as a magnet for retaining the magnetic fluid at a particular position and has a problem of becoming large and also expensive. This bearing also has another problem that magnetic precipitates are developed and adhere to an outer ring and an inner ring.

On the other hand, Patent Literature 3 proposes a reel in which particles of a fluorine compound or silicon compound are applied at the vicinity of the opening of a housing of the reel to prevent the entry of water thereto. This reel can prevent the entry of water thereto at a certain level, but the effect cannot be said to be sufficient.

Patent Literature 4 proposes a bearing in which the exposed surfaces of an outer ring and an inner ring are treated with chromic acid to increase corrosion resistance, and the space between the outer ring and the inner ring is filled with water-repelling grease or oil. In this bearing, it is possible to prevent seawater from entering the space between the outer ring and the inner ring, without requiring an additional member such as a magnet, and further improve corrosion resistance of the outer ring and the inner ring. In this bearing, however, seawater is prone to crystallize on the exposed surfaces of the outer ring and the inner ring, and the salt formed here enters the space between the outer ring and the inner ring and may cause salt engagement. In addition, since the space between the outer ring and the inner ring is filled with a water-repelling material, this bearing has a problem that the load somewhat increases during rotation: particularly when the space between the outer ring and the inner ring is filled with a water-repelling material having relatively high viscosity, such as water-repelling grease, the load during rotation increases.

CITATION LIST

Patent Literature

Patent Literature 1: International Publication WO2013/1611625A1
Patent Literature 2: JP 57-33222 A
Patent Literature 3: JP 2000-41543 A
Patent Literature 4: JP 2004-290153 A

SUMMARY OF INVENTION

Technical Problem

An object of the present invention is to solve the problems accompanying the conventional fishing reels described above and to provide a fishing reel of which resistance to corrosion and salt engagement is improved without increasing the load on an outer ring and an inner ring of a bearing in the relative rotation thereof.

Solution to Problem

The present inventors have found that the above-described problems can be solved by changing the idea of the bearing disclosed in Patent Literature 4, which allows a water-repellent agent to remain in the space between an outer ring and an inner ring, and by covering the inward surfaces of an outer ring and an inner ring with a water-repellent agent having lubricity and also covering the exposed surfaces of the outer ring and the inner ring with a water-repelling material, typically covering the entire surfaces of members constituting a bearing with a water-repelling material, and completed the present invention.

Specifically, the present invention provides as follows.

[1] A fishing reel comprising a bearing comprising an outer ring and an inner ring disposed at an interval from the outer ring, and optionally rolling elements provided between the outer ring and the inner ring in contact with them, and a retainer of retaining the rolling elements at predetermined intervals, wherein inward surfaces of the outer ring and the inner ring are covered with a water-repellent agent having lubricity, typically a liquid water-repellent agent having lubricity, and exposed surfaces of the outer ring and the inner ring are covered with the water-repellent agent or another water-repelling material.

[2] The fishing reel according to [1], which comprises a shield at the vicinity of an opening of a space between the outer ring and the inner ring wherein the shield has at least one end not in contact with either of the outer ring or the inner ring and is covered with the water-repellent agent.

[3] The fishing reel according to [1] or [2], comprising the rolling elements and the retainer, wherein surfaces of the rolling elements and the retainer are covered with the water-repellent agent.

[4] The fishing reel according to any one of [1] to [3], wherein the water-repellent agent has such water repellency that a contact angle is 85 degrees or more when a water drop is dropped on a surface of the bearing covered with the water-repellent agent.

[5] The fishing reel according to any one of [1] to [4], wherein the water-repellent agent is a liquid comprising perfluoropolyether (PFPE) as base oil.

[6] The fishing reel according to any one of [1] to [5], wherein the inward surfaces of the outer ring and the inner ring are covered with a liquid water-repellent agent, and the exposed surfaces of the outer ring and the inner ring are covered with a viscous or solid water-repelling material.

[7] The fishing reel according to any one of [1] to [6], wherein a shield covered with the water-repellent agent or another water-repelling material is further provided in a path leading to an outside environment through the opening of the space between the outer ring and the inner ring.

[8] The fishing reel according to any one of [1] to [7], wherein the bearing is a unidirectional bearing which limits rotation of the inner ring to one direction.

In a fishing reel according to the present invention, as described above, the inward surfaces of the outer ring and inner ring of a bearing are covered with a water-repellent agent (typically a liquid water-repellent agent), and usually a space or void is present between the outer ring and the inner ring. Therefore, it is possible to repel away water which has entered the space between the outer ring and the inner ring, without causing a load on the outer ring and inner ring of the bearing in the relative rotation thereof, and thereby prevent seawater in the space between the outer ring and the inner ring from crystallizing. In addition, in a fishing reel according to the present invention, the exposed surfaces of the outer ring and inner ring of the bearing are covered with the same water-repellent agent or another w water-repelling material. Water therefore can be repelled away from the exposed surfaces of the outer ring and the inner ring, whereby it is also possible to prevent the entry of water into the space between the outer ring and the inner ring and prevent seawater from crystallizing on the exposed surfaces of the outer ring and the inner ring. Thus, the corrosion resistance of a bearing is improved, and an increase in a load during rotation and an abnormal noise, due to the occurrence of salt engagement, can also be prevented.

In a preferred embodiment of the present invention, when a shield is provided at the vicinity of an opening of the space between an outer ring and an inner ring, and different types of water-repellent agents are applied to the inward surfaces and exposed surfaces of the outer ring and the inner ring, the shield can also perform functions of partitioning and retaining individual regions.

DESCRIPTION OF EMBODIMENTS

Embodiments of the present invention will be described in detail with reference to the drawings. However, the present invention is not limited to the embodiments described below.

Figure 1:
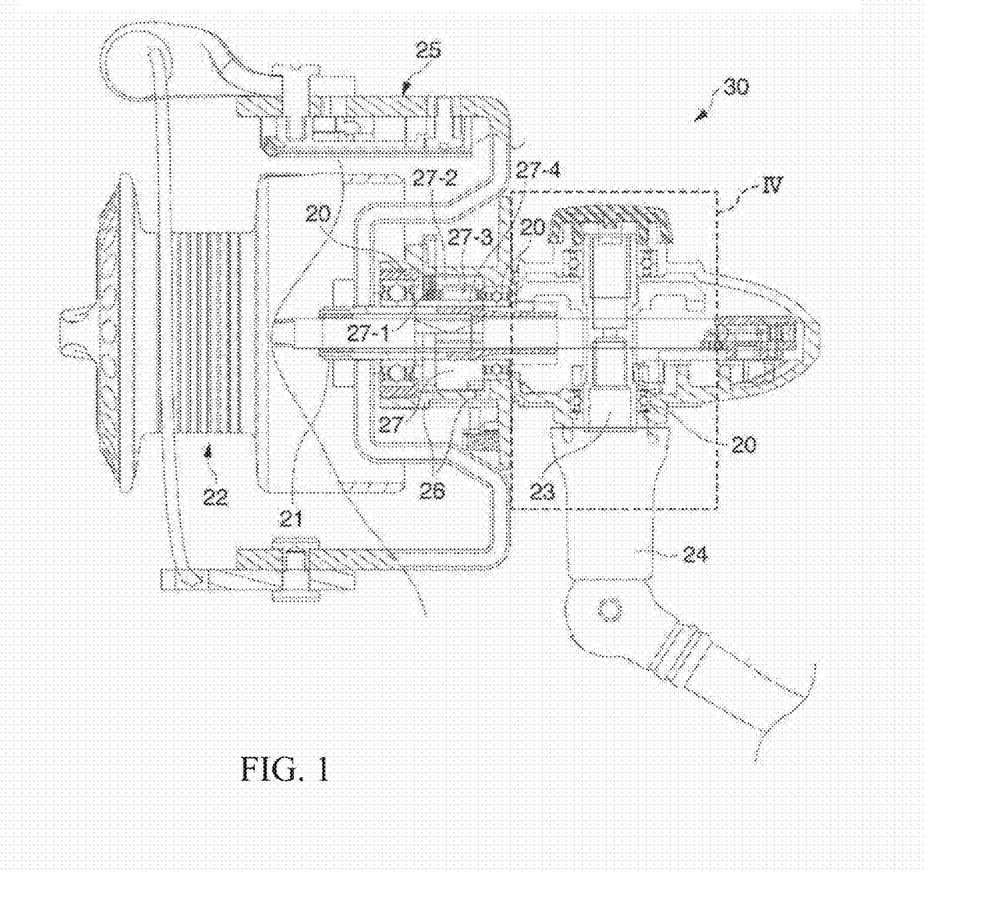
FIG. 1 is a partial cross-sectional view schematically showing the outline of the arrangement of parts of a fishing reel according to one embodiment of the present invention.
Figure 2:
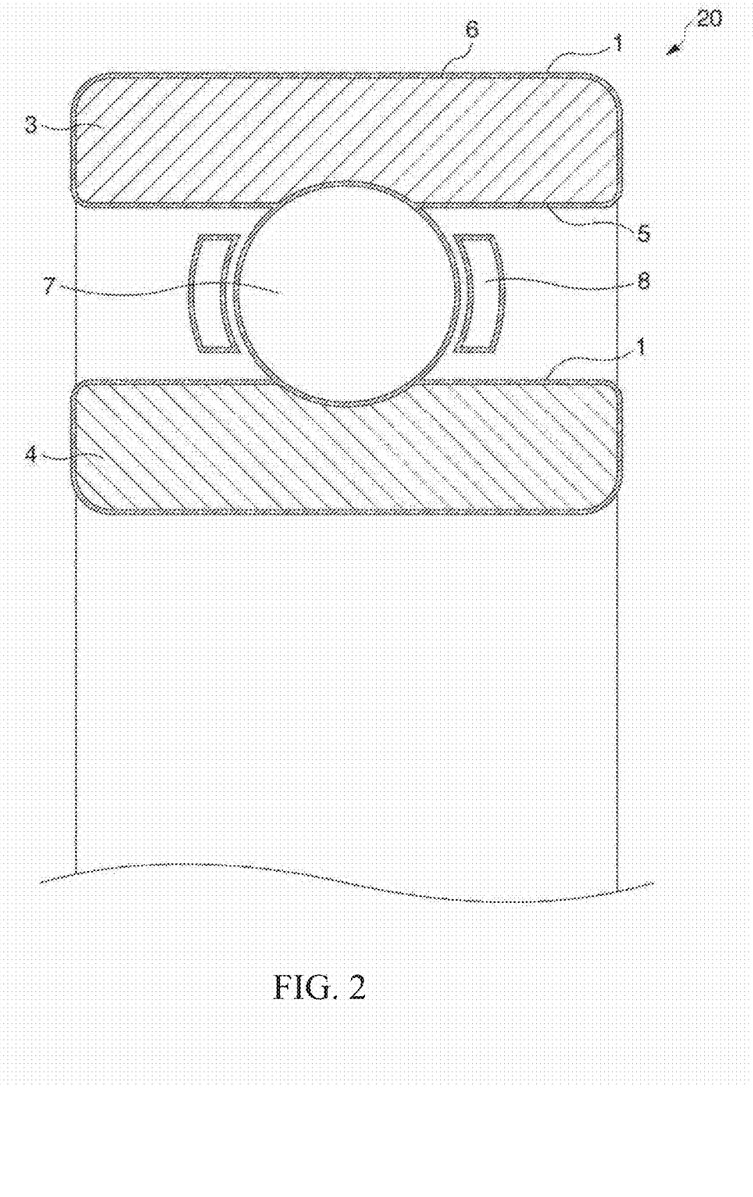
FIG. 2 is a partial cross-sectional view schematically showing a bearing according to another embodiment of the present invention.
Figure 3:
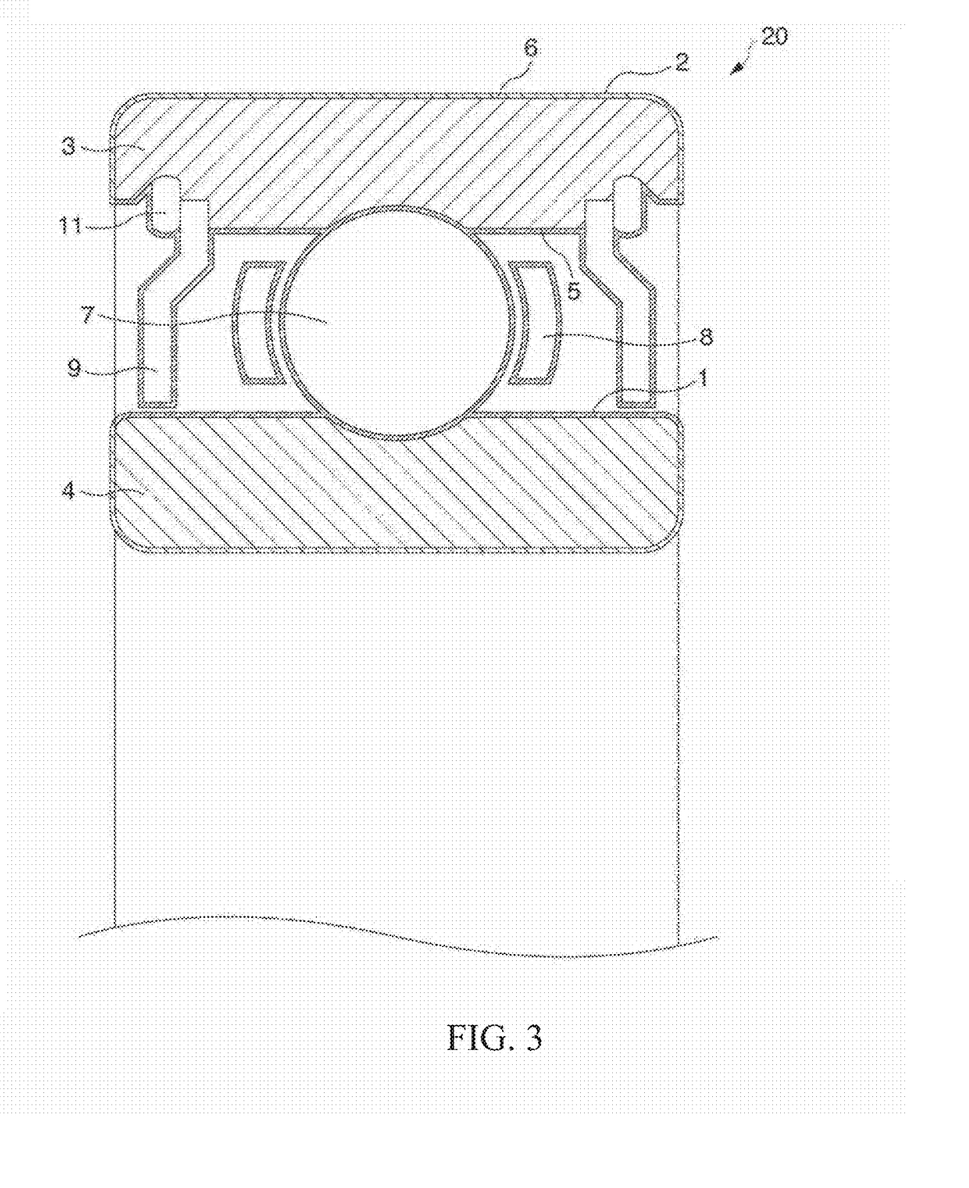
FIG. 3 is a partial cross-sectional view schematically showing a bearing according to still another embodiment of the present invention.
Figure 4:
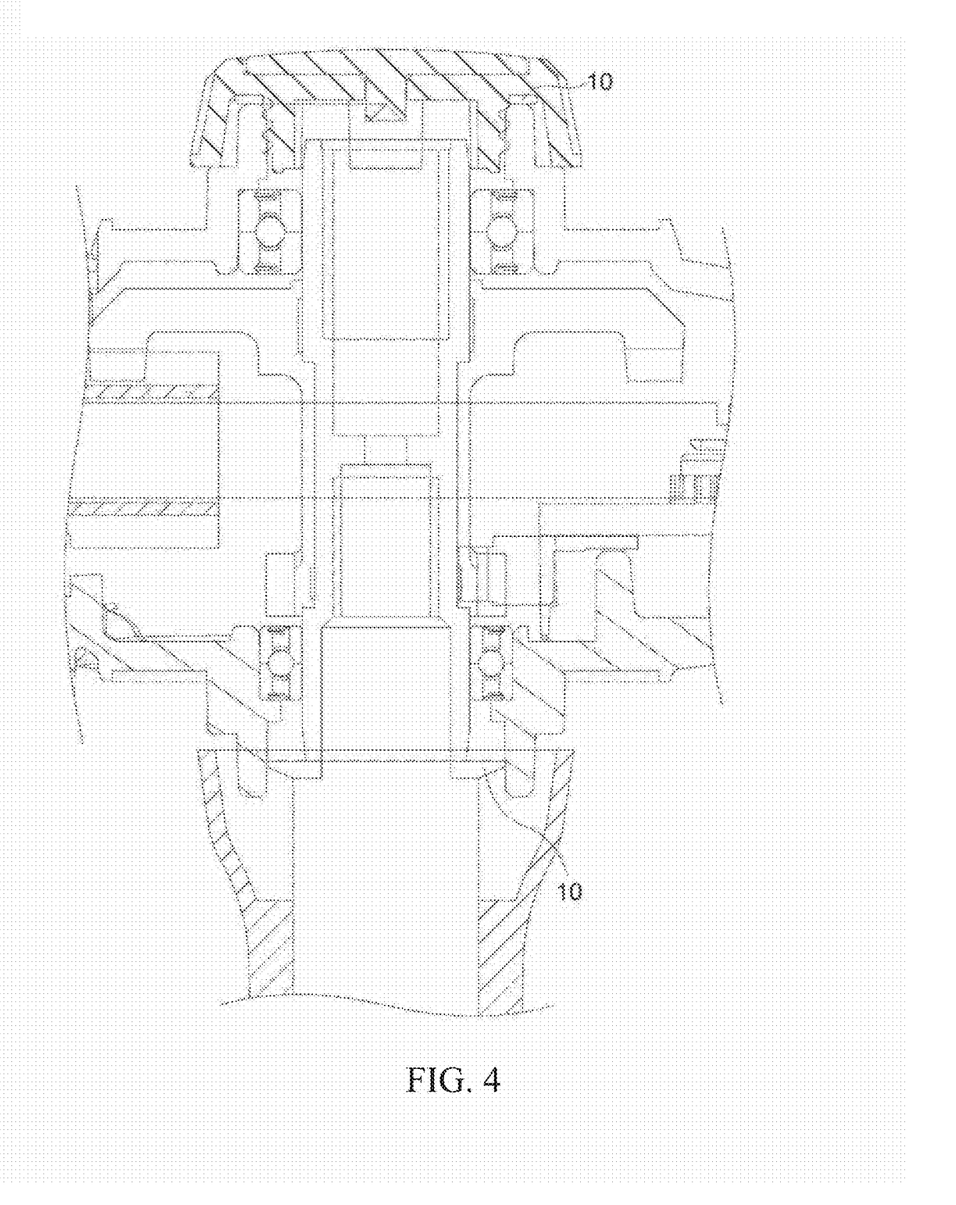
FIG. 4 is a cross-sectional view of the broken line portion shown in FIG. 1 and schematically shows the bearings and surrounding parts of the fishing reel according to one embodiment of the present invention.

FIG. 1 schematically shows the arrangement of the rotary members and surrounding parts thereof in a fishing reel according to one embodiment of the present invention. FIG. 2 schematically shows a bearing according to another embodiment of the present invention. FIG. 3 schematically shows a bearing according to still another embodiment of the present invention. FIG. 4 enlarges and schematically shows the bearings and surrounding parts thereof in the fishing reel shown in FIG. 1.

A fishing reel 30 of the embodiment shown in FIG. 1 has rotary members such as a rotor 25, a pinion gear 21, and a handle shaft 23, and these transmit driving force obtained by rotational motion to other members or rotate by driving force transmitted from other members. These rotary members 21, 23, and 25 are rotatably supported with the reel main body or other parts through a bearing 20 or 27. The bearing 27 comprises a stopper mechanism for limiting the rotation of the rotor 25 to one direction. As a typical example, the bearing 20 will be mainly described below, but it is needless to say that the present invention can also be applied to the bearing 27. In addition, the bearings shown in FIGS. 2 to 4 are rolling bearings, but it is also needless to say that the present invention can be applied to other bearings such as plain bearings having no rolling elements or retainers.

As shown in FIG. 2, the bearing 20 of a fishing reel according to one embodiment of the present invention comprises an outer ring 3, an inner ring 4 disposed at an interval from the outer ring 3, rolling elements 7 provided between the outer ring 3 and the inner ring 4 in contact with these, and a retainer 8 for retaining the rolling elements 7 at predetermined intervals. In this bearing 20, the inward surfaces 5 of the outer ring 3 and the inner ring 4 are covered with a water-repellent agent 1, and a space is present between the outer ring 3 and the inner ring 4. Preferably the water-repellent agent 1 is a liquid water-repellent agent, though not necessarily limited to this. Therefore, in this bearing 20, water present on the inward surfaces 5 of the outer ring 3 and the inner ring 4 can be repelled away without increasing a load on the outer ring 3 and the inner ring 4 in the relative rotation thereof. Seawater is also repelled away by the presence of the water-repellent agent 1, and the formation of salt on the inward surfaces 5 of the outer ring 3 and the inner ring 4 is prevented.

In this bearing 20, the exposed surfaces 6 of the outer ring 3 and the inner ring 4 are also covered with the same (liquid) water-repellent agent 1. Thus, the entry of water into the space between the outer ring 3 and the inner ring 4 is prevented, and the formation of salt on the exposed surfaces 6 of the outer ring 3 and the inner ring 4 is prevented, whereby the entry of salt into the space between the outer ring 3 and the inner ring 4 is also prevented. As a result of these events, in this bearing, the resistance to corrosion and salt engagement of the bearing are improved.

As shown in FIGS. 2 and 3, in this bearing 20, the surfaces of rolling elements 7 and a retainer 8 are also covered with the water-repellent agent 1 which covers the inward surfaces 5 of the outer ring 3 and the inner ring 4. Thus, the entry of seawater into a gap between the rolling elements 7 and raceway surfaces of the outer ring 3 and the inner ring 4 of the bearing and the formation of salt in the gap between these, which directly cause salt engagement, are prevented. Therefore, all the inward surfaces 5 of the outer ring 3 and the inner ring 4 and the surfaces of components between these are preferably covered with the water-repellent agent 1.

As in the bearing according to the embodiment shown in FIG. 2, a water-repellent agent 1 covering the inward surfaces 5 of an outer ring 3 and an inner ring 4 and a water-repellent material 2 covering the exposed surfaces 6 of the outer ring 3 and the inner ring 4 may be the same, but they may be different as in the bearing according to the embodiment shown in FIG. 3. For example, it is possible to cover the inward surfaces 5 of an outer ring 3 and an inner ring 4 with a liquid (and therefore low viscosity) water-repellent agent 1 and cover the exposed surfaces 6 of the outer ring 3 and the inner ring 4 with a relatively high viscosity water-repellent agent or solid water-repelling material 2.

Examples of a liquid water-repellent agent 1 can include water-repelling materials having lubrication properties, such as liquids comprising perfluoropolyether (PFPE) as base oil. Among them, a water-repellent agent 1 preferably has such water repellency that the contact angle is 85 degrees or more when a water drop is dropped on the surface of a bearing covered with it.

In addition, examples of another water-repelling material 2 can also include grease obtained by adding polytetrafluoroethylene (PTFE) as a thickening agent to a liquid comprising perfluoropolyether (PFPE) as base oil. Similarly, a water-repelling material 2 preferably has such water repellency that the contact angle is 85 degrees or more when a water drop is dropped on the surface of the bearing covered with it. Examples of the solid water-repelling material 2 include ordinarily used fluorine coatings.

As shown in FIG. 3, a bearing 20 according to the present invention may have a shield 9 at the vicinity of an opening of the space between an outer ring 3 and an inner ring 4. One end of this shield 9 is coupled to the outer ring 3 or the inner ring 4 by a fixing member 11 or the like, but the other end is not in contact with either of ring 3 or 4. This shield 9 cooperates with the water-repellent material 2 to prevent the entry of water into a space between the outer ring 3 and the inner ring 4. In addition, this shield 9 also has a function of separating a water-repellent agent 1 present on the inward surfaces 5 of the outer ring 3 and the inner ring 4 from a water-repellent material 2 present on other sites such as the exposed surfaces 6 of the outer ring 3 and the inner ring 4 when different water-repellent materials 1 and 2 are applied, or in other cases. A shield 9 is typically composed of an elastic body such as rubber, but may be made of metal. In this bearing, the surface of this shield 9 is covered with the water-repellent agent 1 covering the inward surfaces 5 of the outer ring and the inner ring. Thus, the entry of water and seawater into a space between the outer ring 3 and the inner ring 4 is prevented at a higher level, and the resistance to corrosion and salt engagement are enhanced.

In the present invention, materials constituting a bearing 20 are not particularly limited, and, for example, stainless steel conventionally used from the viewpoint of hardness and impact resistance may be used. Specific examples can include SUS440C and SUJ2. In a bearing 20 according to the present invention, the surfaces of members constituting the bearing are covered with a water-repellent material 1 or 2, and therefore materials constituting the bearing 20 need not be selected with priority given to corrosion resistance. Therefore, materials constituting a bearing can be selected with priority given to strength and impact resistance over corrosion resistance. However, a material having high corrosion resistance may be selected as a material constituting a bearing 20, or a coating for enhancing corrosion resistance may be provided on a bearing surface. Examples of materials excellent in hardness and impact resistance can include SUJ2. Examples of materials particularly excellent in corrosion resistance can include highly corrosion-resistant martensite steel. In addition, examples of a coating provided on a bearing surface can include passivation films such as metal oxides.

As shown in FIG. 4, in a reel according to an embodiment of the present invention, a seal 10 may be further provided in a path communicating with the outside environment through an opening of the space between an outer ring and an inner ring. This seal 10 also, along with the above-described water-repellent material 2 and shield 9, prevents entrance of water and seawater into the inside of a bearing and improves the resistance to corrosion and salt engagement. The seal 10 provided at this position can also be composed of an elastic body such as rubber, metal, or others, and part of its end or the entire end may be fixed to a member constituting the water path. In this embodiment, the seal 10 is also covered with the liquid water-repellent agent 1, and the resistance to corrosion and salt engagement is enhanced.

As shown in FIG. 1, in a reel according to an embodiment of the present invention, an opening 26 (drain hole) that allows water to move from the inside of the reel to the outside of the reel may be provided near a bearing 20 or 27.

In a reel of the present invention, structures and shapes of an outer ring, an inner ring, rolling elements, and a retainer are not particularly limited. Therefore, for example, rolling elements can include balls, cylindrical rollers, conical rollers, barrel-shaped spherical rollers, and needle-shaped rollers. In addition, other components are not particularly limited and may be composed of various parts. In addition, it is to be noted that the above-described water-repellent structure can be applied to all parts having bearings. A reel of the present invention exhibits high resistance to corrosion and salt engagement without causing a load on rotary members in the rotation thereof, by a simple structure.

EXAMPLES

The features of the present invention will be specifically described below by Examples. However, the present invention is not limited in any way by the following Examples.

1. Evaluation of Crystallization Resistance Ability for Bearings Using Concentrated Salt Water Two SUS440C bearings (with shields) were provided, and PFPE oil was dropped on one to cover the surface. On the other hand, PFPE oil was not dropped on the other, but ester grease was applied to the gap between the outer ring and the inner ring of the other, including rolling elements. These bearings were entirely covered with a sufficient amount of 5.5% salt water. Subsequently, the bearings were allowed to stand in an environment of 25° C. for about 4 days until the salt water dried, and the formation of salt was observed.

Figure 5:
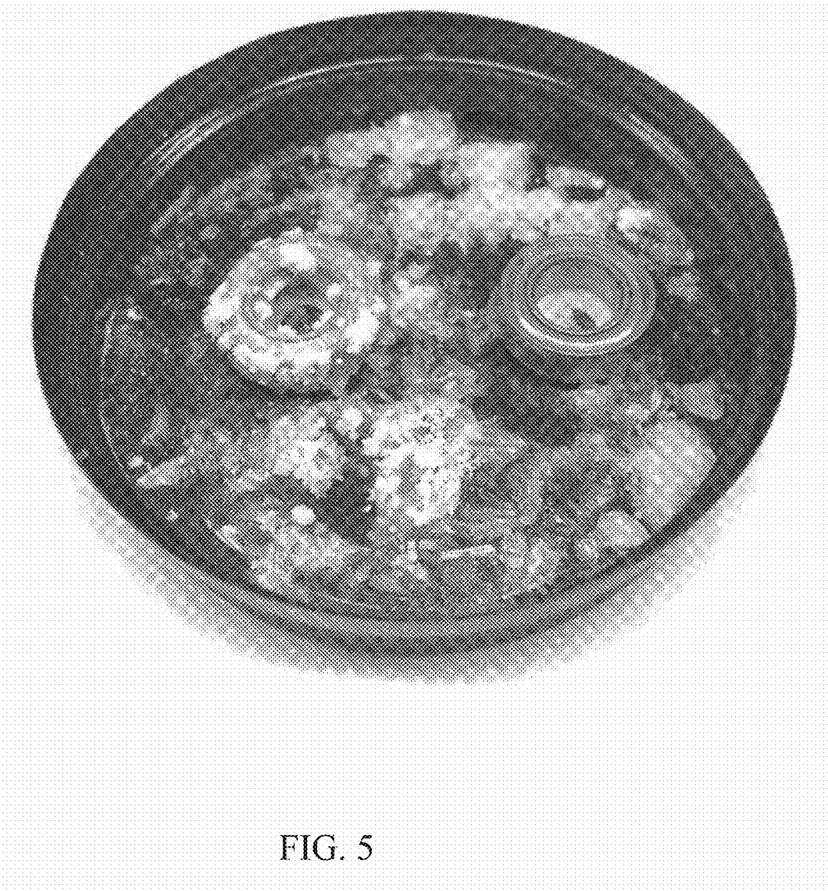
FIG. 5 is a black and white photograph showing the results of a crystallization resistance ability test in Examples. The right side shows a bearing covered with PFPE oil, and the left side shows a bearing to which PFPE oil is not applied.

As shown in FIG. 5, in the bearing of which surface was covered with PFPE oil, the formation of salt was not found at all (right), but in the bearing on which PFPE oil was not dropped, the formation of salt was observed after about half a day passed, and a state in which the entire surface was covered with salt was observed (left) when about 4 days passed.

2. Comparison of Evaluation of Various Properties of Reels

For the reels shown in the following Table 1, rotational torque, resistance to salt engagement, cost, ease of assembly, and dimensional characteristics are evaluated.

ment, cost, ease of assembly, and dimensional characteristics.

REFERENCE SIGNS LIST

1: a (liquid) water-repellent agent
2: a water-repellent material
3: an outer ring
4: an inner ring
5: the inward surfaces of the outer ring and the inner ring
6: the exposed surfaces of the outer ring and the inner ring
7: a rolling body
8: a retainer
9: a shield
10: a seal
11: a fixing member
20: a bearing
21: a pinion gear
22: a spool
23: a handle shaft
24: a handle
25: a rotor

TABLE 1

|  |  | Example 1 | Example 2 | Example 3 | Comparative Example 1 | Comparative Example 2 | Comparative Example 3 | Comparative Example 4 |
|---|---|---|---|---|---|---|---|---|
| Water-repellent agent | PFPE oil[*1] | ○ | X | ○ | X | X | X | X |
|  | PFPE grease[*2] | X | ○ | X | ○ |  |  |  |
| Lubricant |  | X | X | X | X | ○ | ○ | X |
| Magnetic fluid and magnetic force-generating member |  | X | X | X | X | X | X | ○ |
| Place where water-repellent agent, lubricant, or magnetic fluid is applied | gap between outer ring and inner ring | ○[*3] | ○[*3] | ○[*3] | ○[*4] | ○[*3] | ○[*3] | ○[*3] |
|  | exposed surfaces of outer ring and inner ring | ○ | ○ | ○ | X | X |  | X |
| Shield |  | X | ○[*6] | ○[*8] | X | ○[*7] | X | X |

[*1] a liquid comprising perfluoropolyether (PFPE) as base oil
[*2] grease obtained by adding polytetrafluoroethylene (PTFE) as a thickening agent to a liquid comprising perfluoropolyether (PFPE) as base oil ester grease
[*3] The inward surfaces of the outer ring and the inner ring are covered, but the gap between the outer ring and the inner ring is maintained.
[*4] The gap between the outer ring and the inner ring is filled with the water-repellent agent.
[*5] retained only in a certain region of the gap between the outer ring and the inner ring.
[*6] One end of a shield made of rubber and having a size corresponding to the opening was fixed to the outer ring by a fixing member. The other end is not in contact with the inner ring, and the shield is covered with PFPE grease.
[*7] One end is fixed to the outer ring by a fixing member, and the other end is in contact with the inner ring.
[*8] One end of a shield made of metal and having a size corresponding to the opening was fixed to the outer ring by a fixing member. The other end is not in contact with the inner ring, and the shield is covered with PFPE oil.

The evaluation of the properties of the rails is shown together in the following.

26: an opening (drain hole)
27: a unidirectional bearing

TABLE 2

|  | Example 1 | Example 2 | Example 3 | Comparative Example 1 | Comparative Example 2 | Comparative Example 3 | Comparative Example 4 |
|---|---|---|---|---|---|---|---|
| Rotational torque | ○ | Δ | ○ | Δ | X | ○ | X |
| Resistance to salt engagement | ○ | ○ | ○ | Δ | Δ | X | ○ |
| Cost | ○ | ○ | ○ | ○ | ○ | ○ | X |
| Ease of assembly | ○ | Δ | ○ | ○ | Δ | ○ | Δ[*1] |
| Dimensional characteristics | ○ | ○ | ○ | ○ | ○ | ○ | X |

[*1] Magnetic foreign substances are generated and adhere to the inner ring and the outer ring.

As described above, it was demonstrated that the fishing reels according to the present invention had excellent properties in any of rotational torque, resistance to salt engage- 27-1: a retainer
27-2: an outer ring
27-3: a roller (cylindrical shape)

27-4: an inner ring
30: a fishing reel

The invention claimed is:

1. A fishing reel comprising:
   a bearing comprising;
      an outer ring;
      an inner ring disposed at an interval from the outer ring forming a gap therebetween;
      rolling bodies provided between the outer ring and the inner ring in contact with them; and
      a retainer retaining the rolling bodies at predetermined intervals,
   wherein inward surfaces of the outer ring and the inner ring and covered with a water-repellent agent having lubricity, and exposed surfaces of the outer ring and the inner ring are covered with the water-repellent agent or another water-repelling material, and
   wherein the fishing reel comprises a shield extending from one of the outer ring and inner ring into the gap toward a distal end that stops short of contact with the other of the outer ring and inner ring, such that an unfilled opening is formed between the distal end of the shield and the other of the outer and inner ring, and wherein the shield is covered with the water-repellent agent.

2. The fishing reel according to claim 1, comprising the rolling bodies and the retainer, wherein surfaces of the rolling bodies and the retainer are covered with the water-repellent agent.

3. The fishing reel according to claim 1, wherein the water-repellent agent has such water repellency that a contact angle is 85° or more when a water drop is dropped on a surface of the bearing covered with the water-repellent agent.

4. The fishing reel according to claim 1, wherein the water-repellent agent is a liquid comprising perfluoropolyether (PFPE) as base oil.

5. The fishing reel according to claim 1, wherein the inward surfaces of the outer ring and the inner ring are covered with a liquid water-repellent agent, and the exposed surfaces of the outer ring and the inner ring are covered with a viscous of solid water-repelling material.

6. The fishing reel according to claim 1, wherein the shield covered with the water-repellent agent or another water-repelling material is further provided in a path leading to outside atmosphere from the opening of the gap between the outer ring and the inner ring.

7. The fishing reel according to claim 1, wherein the bearing is a unidirectional bearing limiting rotation of the inner ring to one direction.

8. The fishing reel according to claim 1, wherein the gap between the outer ring and the inner ring is not filled with the water-repellent agent.

9. The fishing reel according to claim 1, wherein the bearing is located at a place which water reaches from outside of the reel through the unfilled opening between sliding parts.

* * * * *